(12) United States Patent
Nielsen et al.

(10) Patent No.: US 8,578,839 B2
(45) Date of Patent: Nov. 12, 2013

(54) APPARATUS FOR PREPARING AN INFUSION

(75) Inventors: Henrik Nielsen, Fontainebleau (FR);
David Petitdemange, Vaux-le-Penil (FR)

(73) Assignee: Handpresso, Fontainebleau (FR)

( * ) Notice: Subject to any disclaimer, the term of this patent is extended or adjusted under 35 U.S.C. 154(b) by 883 days.

(21) Appl. No.: 12/527,092

(22) PCT Filed: Feb. 14, 2008

(86) PCT No.: PCT/FR2008/050241
§ 371 (c)(1),
(2), (4) Date: Sep. 9, 2009

(87) PCT Pub. No.: WO2008/104713
PCT Pub. Date: Sep. 4, 2008

(65) Prior Publication Data
US 2010/0011966 A1    Jan. 21, 2010

(30) Foreign Application Priority Data
Feb. 16, 2007  (FR) .................................... 07 01131

(51) Int. Cl.
*A47J 31/32*   (2006.01)

(52) U.S. Cl.
USPC .............................. 99/302 R; 99/295; 99/323

(58) Field of Classification Search
USPC ......... 99/302 R, 295, 323; 417/238, 506, 437
See application file for complete search history.

(56) References Cited

U.S. PATENT DOCUMENTS

| 1,754,146 | A | * | 4/1930 | Calvino | ..................... 99/302 R |
| 2,056,018 | A | * | 9/1936 | Popp | ................................ 15/406 |
| 2,205,290 | A | * | 6/1940 | Herrera | ..................... 99/302 R |
| 2,620,088 | A | * | 12/1952 | Tellander | ..................... 220/318 |
| 2,869,451 | A | * | 1/1959 | Brandl | ........................ 99/302 R |
| 2,989,227 | A | * | 6/1961 | Statham | ........................ 417/238 |

(Continued)

FOREIGN PATENT DOCUMENTS

| FR | 586285 A | 3/1925 |
| FR | 734854 A | 10/1932 |

(Continued)

OTHER PUBLICATIONS

Bellaire, EPO Machine Translation of FR586285, pp. 1-2.*

(Continued)

*Primary Examiner* — Gene Kim
*Assistant Examiner* — Matthew B Stanczak
(74) *Attorney, Agent, or Firm* — The Webb Law Firm

(57) ABSTRACT

The invention relates to an appliance including an infusion chamber having an opening for receiving a fill, a closure part for said chamber, a water container connected to the chamber, pressurizing means for delivering air into the container, and control means suitable for causing a certain volume of water to be delivered from said container into said chamber, said pressurizing means being connected to a compression chamber that is arranged between said pressurizing means and said container and that includes inlet and outlet isolation means. According to the invention, with the water container full and the outlet isolation means including the control means, the control means is suitable for causing the compressed air to expand suddenly in the container and to flow with a curve of decreasing pressure. The invention is applicable to appliances for household use.

13 Claims, 3 Drawing Sheets

(56) References Cited

U.S. PATENT DOCUMENTS

| | | | | |
|---|---|---|---|---|
| 3,113,503 | A * | 12/1963 | Vulliet-Durand | 99/282 |
| 3,361,052 | A * | 1/1968 | Weber | 99/299 |
| 3,478,670 | A * | 11/1969 | Fuqua | 99/283 |
| 4,375,409 | A * | 3/1983 | Gentry | 210/232 |
| 4,386,109 | A * | 5/1983 | Bowen et al. | 426/241 |
| 4,967,647 | A * | 11/1990 | King | 99/280 |
| 5,127,317 | A * | 7/1992 | Takayanagi et al. | 99/289 T |
| 5,458,165 | A * | 10/1995 | Liebmann, Jr. | 141/64 |
| 5,566,730 | A * | 10/1996 | Liebmann, Jr. | 141/64 |
| 6,805,042 | B2 * | 10/2004 | Mordini et al. | 99/299 |
| 7,398,726 | B2 * | 7/2008 | Streeter et al. | 99/305 |
| D606,795 | S * | 12/2009 | Liao et al. | D7/300 |
| D614,432 | S * | 4/2010 | Liao et al. | D7/300 |
| 8,127,664 | B2 * | 3/2012 | Nielsen et al. | 99/302 R |
| 8,381,635 | B2 * | 2/2013 | O'Brien et al. | 99/302 R |
| 2002/0178932 | A1 * | 12/2002 | Cai | 99/516 |
| 2006/0230946 | A1 | 10/2006 | Cheng | |
| 2008/0196593 | A1 * | 8/2008 | Shrader et al. | 99/300 |
| 2008/0302252 | A1 * | 12/2008 | O'Brien et al. | 99/302 R |
| 2009/0029021 | A1 | 1/2009 | Nielsen et al. | |
| 2010/0162899 | A1 * | 7/2010 | O'Brien et al. | 99/302 R |

FOREIGN PATENT DOCUMENTS

| | | |
|---|---|---|
| FR | 2896676 A1 | 8/2007 |
| WO | 8706812 A1 | 11/1987 |
| WO | WO 2007088309 A1 * | 8/2007 |

OTHER PUBLICATIONS

Bellaire, Jul. 26, 2012, EPO Machine Translation of FR586285, pp. 1-2.*

* cited by examiner

APPARATUS FOR PREPARING AN INFUSION

BACKGROUND OF THE INVENTION

The invention relates to an appliance for preparing an infusion from a fill of substance in powder or pod form, the appliance comprising a case including an infusion head containing a chamber that presents an opening through which the fill can be inserted, that presents an end wall with a hot water feed nozzle, and that is fitted with a closure part having an infusion outflow orifice, the closure part being movably mounted relative to said chamber to occupy two positions, an open position or a closed position, corresponding respectively to filling/emptying said chamber, and to preparing the infusion, the case also having a water container communicating with said nozzle.

More precisely, the invention relates to an appliance in which the case has a body including pressurizing means with an active state and an inactive state and designed, in the active state, to deliver air for the purpose of pressurizing said water container, and control means suitable for causing a certain volume of water raised to an infusion temperature to be delivered from said container into the infusion chamber.

An appliance of that type is described for example in the French patent application filed by the Applicant on Feb. 1, 2006, under the No. 06/00910.

Although that type of appliance produces a satisfactory infusion from a fill of coffee, it is found during infusion cycles that, for a given quantity of grounds, the pressure delivered by the air pump follows a slow progressive curve starting from a low pressure on starting and rising to a high pressure in a final stage. In order to maintain that pressure, it is therefore necessary to operate the pump before and throughout the infusion cycle, thereby leading to a non-negligible level of energy consumption on that type of manual appliance. In addition, when making an infusion of coffee, this progressive rise in pressure is not the best way of extracting all of the aroma from the coffee grounds. It happens that during the starting stage, and because of the low pressure, the water leaves the container at low pressure and at a low flow rate so that only the top layer of the grounds become soaked in water, whereas the majority of the grounds are merely moistened and do not have the time to expand in full. Thereafter, the water tends to pass through that majority via multiple interstices or paths that are being created, without impregnating the grounds sufficiently to extract all of the aroma therefrom. As a result after a certain lapse of time, once the pressure reaches the maximum threshold as determined by the manufacture, the hot water follows the preferred paths and flows strongly but without causing the grounds to swell sufficiently.

As described in patent application US 2006/0230946, an improvement is also known relating to pressurizing the water container, which improvement consists in associating a compression chamber with the pressurizing means, the compression chamber being arranged between said pressurizing means and said water container and including inlet and outlet isolation means. However that application does not solve the above-mentioned problem.

SUMMARY OF THE INVENTION

A main object of the invention is thus to remedy that drawback by proposing novel means for preparing an infusion, in particular by optimizing the pressurizing means.

According to the invention, with the water container being full and the outlet means including the control means, the control means are suitable, when the pressurization means are placed in the inactive state, for causing the compressed air to expand suddenly into said water-filled container and then to flow with a pressure curve that decreases down to the end of an infusion cycle.

By this combination of means, intermediate compression chamber and water-filled container, the pressurizing means enable the pressure to be raised to a determined value while the inlet isolation means are closed, and then, with the pressurizing means inactive, the control means allow said pressure to expand suddenly into the water-filled container, thereby initially causing the water to be expelled suddenly and thus to hammer against the fill of grounds. It has been found that this instant arrival of water without significant restriction enables the entire fill of grounds to swell in the first seconds of infusion, after which the progressive drop in pressure slows down the rate at which hot water passes through the grounds and thus encourages greater extraction of aroma, thereby leading to a better infusion in a total time lapse that is equivalent to that of preparing an infusion without a compression chamber. This swelling phenomenon may be explained by a large mass of water penetrating into the coffee grounds and wetting them completely, thereby causing the grounds to stick to one another and almost form a block of grounds. The compression chamber thus makes it possible, during an infusion cycle, for the water to be thrust from the container with air pressure and water flow rate following a curve that decreases as a function of time.

According to another characteristic of the invention, said inlet isolation means include an inlet passage containing a check valve and the outlet isolation means include an outlet nozzle connected to a duct leading to the water container and including the control means formed by an on/off type valve.

Thus, with the inlet isolation means in a closed state corresponding to the check valve being closed and to the pressurizing means being in the inactive state, the compression chamber stores the compressed air and it is only the control means that allows said volume of compressed air to expand directly onto the water in the full container, thereby triggering the infusion cycle.

The invention also applies, more particularly, to an appliance that includes a body of oblong shape that is ergonomic and that has said head extending transversely therefrom so that part of the body constitutes grip means enabling the user to operate the appliance during the infusion cycle by holding it over a coffee cup solely in the hand.

An appliance of that type is described in greater detail in the above-mentioned French patent application.

Although that appliance is of the portable type and presents a structure that is extremely simplified, comprising three portions, one of which forms the body and is suitable for being held in the hand, its pressurizing means remain an element that is important in the operation thereof, and because of the technical solution implemented, an element of the appliance that is expensive.

Another object of the invention is thus to improve the appliance and provide an appliance of a design that is much simpler than that of the Applicant's patent application, by providing pressurizing means of simple and inexpensive design, while achieving great convenience and safety in use, and also reducing the amount of energy that needs to be expended to expel the water during an infusion cycle.

Thus, according to another important characteristic of the invention, the pressurizing means comprise a hand-operated air pump in the form of a tube with a cylindrical wall slidably receiving a piston and presenting one end that is perforated to pass a piston rod and another end that is closed by a check valve connected to the inlet passage of the compression chamber, which chamber is arranged between said wall of the tube and the body, which body has an internal wall mounted in leaktight manner on the wall of the tube.

By means of this particular implementation of the pump and the compression chamber as a single assembly, not only is a structure obtained that is simple, compact, and therefore inexpensive to fabricate, but also an ergonomic advantage is achieved in that the appliance is more convenient to use and does not require great effort on the part of any user.

Furthermore, because of this extremely clean and ergonomic structure, the appliance is self-contained so far as its pumping means are concerned, thereby enabling it to be used at any location.

BRIEF DESCRIPTION OF THE DRAWINGS

The characteristics and advantages of the invention appear further from the following description given by way of non-limiting example with reference to the accompanying drawings, in which.

DESCRIPTION OF THE PREFERRED EMBODIMENTS

Figure 1:
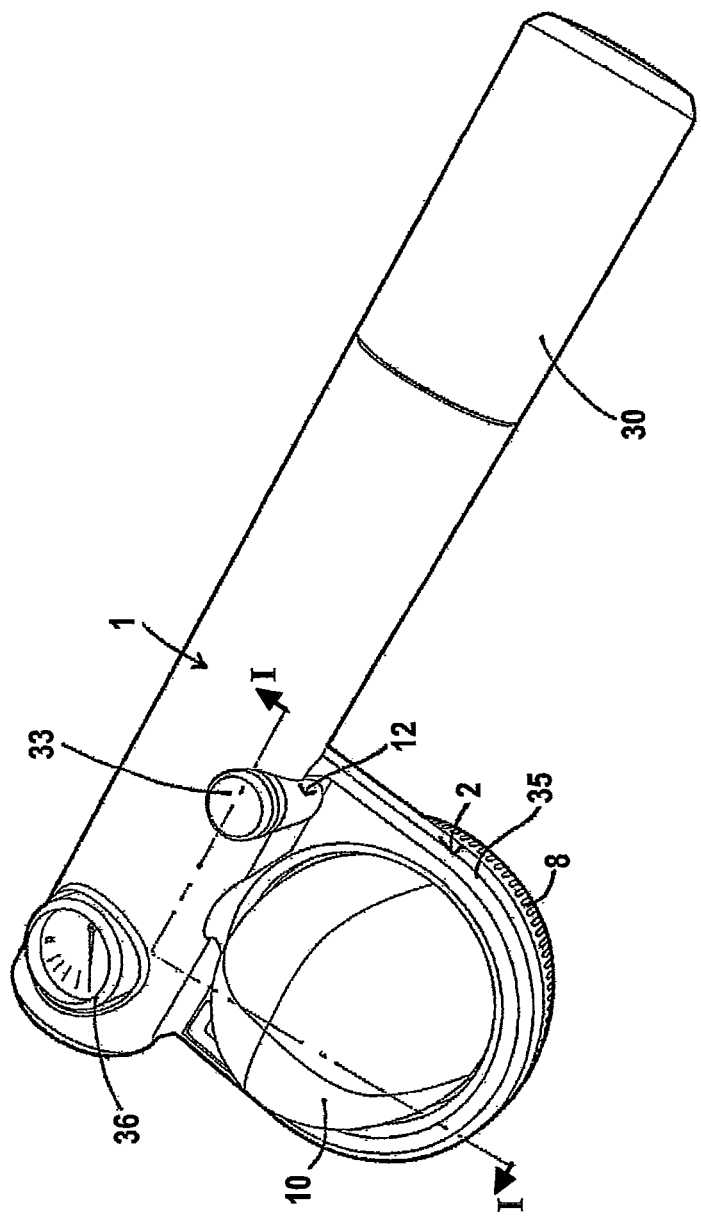
FIG. 1 is a perspective view from above of an appliance of the invention.

FIG. 1 shows an appliance for making an infusion, in particular from a fill of coffee presented in the form of powder or of a pod having a textile or metal body.

Figure 3:
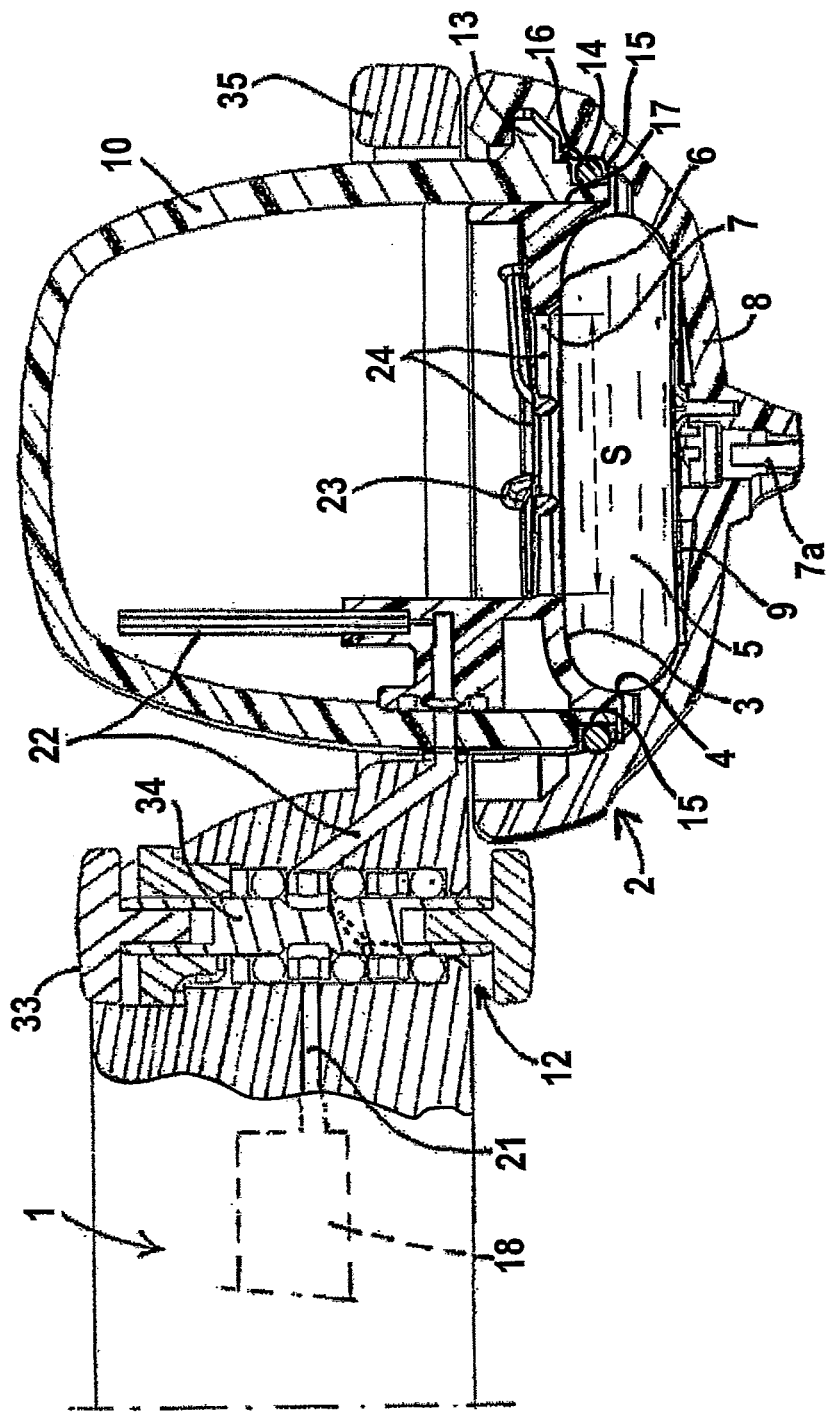
FIG. 3 is a vertical section on broken line I-I in FIG. 1.

As can be seen better in FIGS. 1 and 3, the appliance comprises a case 1 that includes an infusion head 2 containing an infusion chamber 3 presenting an opening 4 through which the fill of coffee can be inserted; the figures show a fill 5 in the form of a textile pod containing one dose of ground coffee.

In its end wall 6, the chamber 3 presents a nozzle 7 for feeding hot water, and it is also fitted with a closure part 8 generally in the form of a bowl including a support grid 9 and an outflow orifice 7a for delivering the prepared infusion. The head also includes a water container 10 communicating with the nozzle 7.

The case also includes a body containing pressurizing means 11 with an active or an inactive state and designed, in its active state, to deliver air for the purpose of putting said water container under pressure, and control means 12 suitable, during an infusion cycle, for causing a certain volume of water raised to an infusion temperature to be delivered from said container into the infusion chamber. The closure part 8 is mounted to move relative to the case and to the chamber 3 so as to occupy two positions, an open position and a closed position, corresponding respectively to filling/emptying the chamber, and to preparing the infusion.

In order to obtain a structure that is compact and ergonomic, the water container is arranged above the chamber 3 and is generally in the form of a bell with its mouth 17 engaging on the outside wall of the chamber, which wall presents, for this purpose, a shape that is complementary to the shape of the mouth of the container.

In a preferred embodiment of the invention, the closure part 8 in the form of a bowl presents an edge in the form of a cylindrical ring and it is removably mounted by means of a bayonet fastener on a cylindrical bearing surface 13 that is secured to the wall of the container.

Sealing between the opening of the chamber and the closure part is provided by interposing an annular gasket 14 that is fitted in a groove 15 formed in the wall of the container and facing the internal side wall 16 of said ring.

The pressurizing means 11 are connected to a compression chamber 18 (FIG. 2) that is arranged between said pressurizing means and said water container and that includes inlet and outlet isolation means, the inlet isolation means being subordinate to the state of the pressurizing means.

According to the invention, with the water container 10 being full and the outlet means including the control means 12, the control means are suitable, when the pressurization means are placed in the inactive state, for causing the compressed air to expand suddenly into said water-filled container 10 and then to flow with a pressure curve that decreases down to the end of an infusion cycle.

Figure 2:
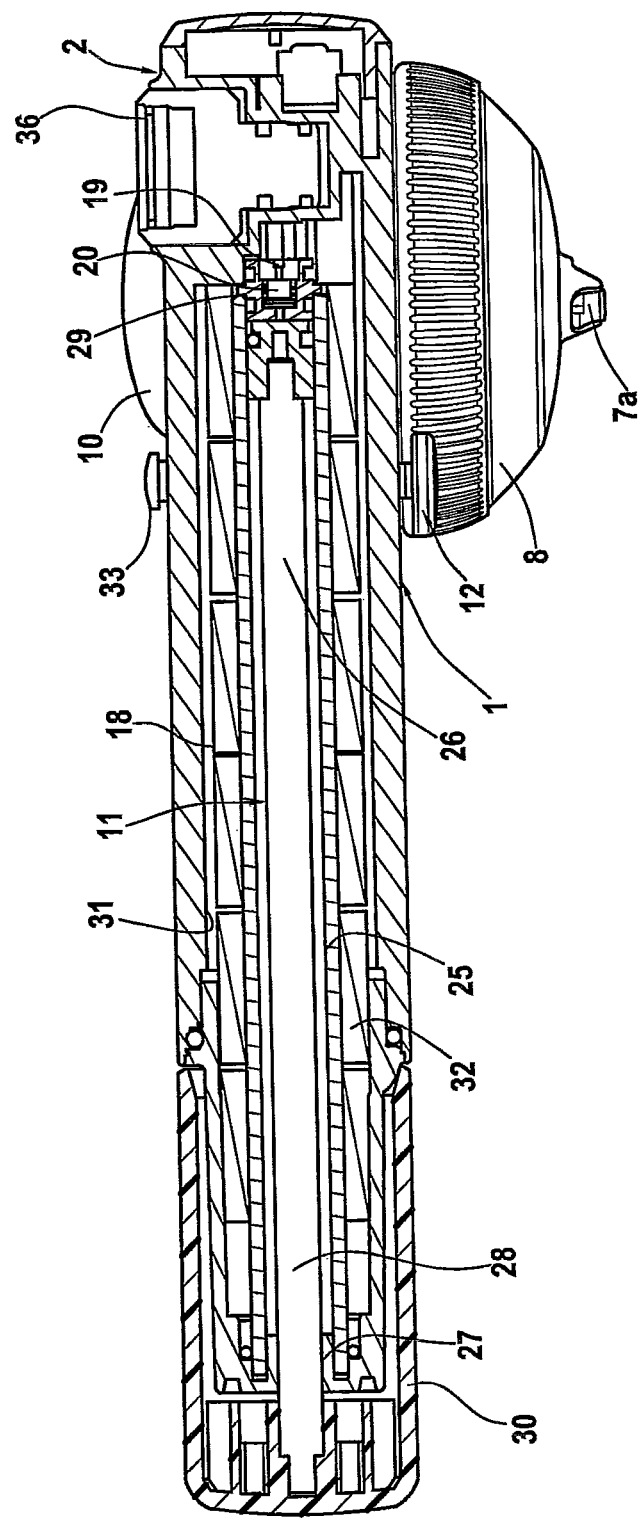
FIG. 2 is a view in section and in elevation showing the FIG. 1 appliance.

As shown in FIG. 2, the inlet isolation means include an inlet passage 19 including a check valve 20. In addition, in this general context, and by way of example, the isolation means may comprise either a stop cock or else switching off an electric pump, thereby placing the pressurizing means in its inactive state. The outlet isolation means comprise an outlet nozzle 21 connected to a duct 22 (shown diagrammatically in FIG. 3) leading to the water container and including control means 12 in the form of an on/off type valve, i.e. a valve that allows the entire flow of air to pass without controlling it, or else prevents it from passing.

Such a valve may be controlled manually or electrically.

As shown, the duct 22 opens out vertically into the top portion of the water container, thereby making it easier to connect it to the surrounding air for safety purposes, as explained below.

In a preferred embodiment, the duct 22 presents a diameter that is substantially equal to 0.3 millimeters (mm) either at the valve 12, or else over a fraction or all of its length; this serves to obtain a flow rate that is suitable for properly expelling the water from the full container while encouraging the preparation of foam on the surface of the infusion.

Preferably, said pressure in said compression chamber is raised to a value of the order of 10 bars to 20 bars, and preferably about 17 bars, so as to obtain an expresso that is strong, tasty, and has an attractive coffee color with a smooth foam.

Thus, the very high air pressure is maintained at the selected value in the compression chamber firstly by the inlet isolation means being placed in a closed state, i.e. an inactive state for the pressurizing means and the check valve 20, and secondly by the valve 12, so that the pressure is released into the container full of water only at the request of the user. This expansion of compressed air thus expels the water from the container suddenly onto the grounds that will expand almost immediately, thereby giving rise to ideal extraction of aroma. Thereafter, the pressure falls off progressively following a curve of decreasing slope, thereby slowing down the water flow rate so as to obtain an infusion that is found to be excellent, in particular because the maximum extraction of aroma.

When the manufacturer decides to make a low-pressure appliance, e.g. using a pressure of about 2 bars to 5 bars, the compression chamber and the on/off type valve perform the same functions, but with a result that is not quite as good as that obtained at high pressure.

As can be seen clearly in FIG. 1, the case 1 presents a portable structure with its body presenting an ergonomic and tubular oblong shape, with the head 2 being located transversely on one side thereof, and with the body containing the pressurizing means 11.

This orthogonal and offset position for the head relative to the longitudinal axis of the body enables part of the body to constitute grip means that make it possible, during the infusion cycle, for the head to be placed in a position where the outflow orifice 7a from the closure part 8 is directed downwards towards a cup for collecting the infusion. The grip means are shaped so as to be convenient to grip in one hand of a user so as to constitute a handle.

According to another characteristic of the invention, the hot water feed nozzle 7 includes a distribution grid 23 with an outside face of dimensions that practically correspond with the inlet area S of the face of the fill that is in contact with said grid, i.e. that presents substantially the same dimensions. The inlet area of said face represents the area outlined by the grid and forming part of the face either of the pouch containing the grounds, whether made of paper, textile, or metal, and commonly referred to as a pod, or else to the area of the grounds coming into contact with the grid. In general, pods have a diameter of 44 mm, and the recommended diameter for the inlet area is about 35 mm.

As shown in FIG. 2, the grid 23 presents a plurality of holes 24 with the sum of their flow sections forming a fluid flow section that occupies about 10% to 25% of the area of the face of the fill, and preferably occupies 17%.

According to another important characteristic of the present invention, the pressurizing means 11 comprise a manual air pump comprising a tube 25 having a cylindrical wall receiving a piston 26 that is longitudinally slidable in the tube and presenting an end 27 with a hole for passing the rod 28 of the piston, which rod is connected to a handle 30. An opposite end 29 of the tube is closed by the check valve 20 and is connected to the inlet passage 19 of the compression chamber 18. This pump is of conventional type and presents an air leak formed at the end 27 and a compression valve member formed by the piston 26. In this embodiment, it will be understood that the inlet isolation means occupies a closed state as a result of both the compression valve member and the check valve 20 being closed when the pump ceases to operate, corresponding to the inactive state of the pressurizing means. In this embodiment, said chamber is formed between said wall of the tube and the body that has an inside wall 31 connected in leaktight manner with the wall of the tube.

Preferably, the inside wall 31 of the body is cylindrical and is arranged coaxially around the tube, and the compression chamber 18 is suitable for receiving at least one volume element 32 for adjusting the capacity of said chamber 18.

Preferably, the volume element 32 is constituted by a ring fitted around the tube.

Thus, if so desired, it is possible by construction to reduce the initial capacity of the chamber to a determined volume, merely by putting one or more rings 32 into place. In the example shown in FIG. 1, there are six such elements.

Furthermore, because the head is located transversely on one side of the body, the control means 12 are located in the common region at the anterior intersection between the head and the body (FIG. 1). Thus, the valve 12 is arranged on the body in the grip means close to the head 2 and includes a pushbutton 33 projecting from the case so as to be suitable for being controlled by the user's thumb when the user is holding the appliance in one hand.

As shown diagrammatically in FIG. 3, the on/off type valve 12 includes a movable slider 34 secured to the pushbutton 33 and slidable in a two-port cylinder so as to occupy, starting from a rest state corresponding to a first closure of the outlet isolation means of the compression chamber: a first port corresponding to expansion and thus to delivery of compressed air into the container and the beginning of infusion; and a second port corresponding to air pressure being stopped once more in the container and thus stopping infusion, with the container being connected to ambient air.

One of the advantages of the invention is to provide an appliance that is prepared for operation by a simple manual air pump enabling the compression chamber to be raised to the pressure selected by the user as recommended by the manufacturer for obtaining a perfect foamy expresso. With such a pump, it is easy to raise the pressure to around 17 bars.

In order to make it easier for the user to select the pressure in the chamber 18, a pressure gauge 36 is arranged in the anterior region of the body and is connected to said chamber.

By means of this particular structure for the compression chamber, there is provided an appliance that is compact and lightweight, that can be held in one hand, and that is convenient to use since it makes conventional use of a conventional hand pump.

In a preferred embodiment of the invention and as shown in the drawings, the water container 10 comprises a thermally insulating jacket of plastics material so as to keep hot the water that is fed to it from the outside at a temperature that is suitable for preparing the infusion, preferably selected to lie in the range 80° C. to 100° C.

By way of example, this hot water may come from a tap or a kettle.

In order to be able to provide a range of appliances of the invention so as to satisfy different users, the container 10 is mounted in removable manner by means of screws (not shown) on a connection frame 35 that is secured to the case, thus enabling it to be replaced by containers of other capacities. This makes it possible to have a full water container that is always of appropriate size, and to guarantee that all of the water is expelled suddenly onto the fill of coffee, in particular.

In the example described in the figures, the container 10 has a capacity of about 50 milliliters (mL) which is practically equal to that of a conventional coffee cup, generally lying in the range 40 mL to 50 mL.

The frame 35 is preferably made of a rigid material that withstands mechanical stresses, e.g. of metal or of a plastics material filled with glass fibers; this is to ensure that the water container is properly secured.

The method of making an infusion of coffee in a so-called "expresso" mode is implemented by performing the following steps:

starting from the open position of the closure part 8, the grip means constituted by a portion of the body and forming a handle are grasped in one hand only and the chamber 3 is turned so that its opening 4 faces upwards;

the container 10 is filled from a source of hot water external to the appliance by pouring water that has been previously heated to a temperature lying in the range 80° C. to 100° C. through the holes 24 in the grid 23;

a fill of coffee is placed in the infusion chamber;

the chamber is closed and locked by the closure part 8, by engaging the bayonet fastener;

the appliance is turned over by means of its handle by causing the body to turn in the hand so as to place the outflow orifice 7a facing downwards over a cup of coffee;

the hand pump is put into operation using its handle 30 until the selected pressure, e.g. 17 bars, is obtained in the compression chamber 18; and then the thumb of the hand holding the appliance is pressed down on the pushbutton 33 to cause the slider 34 to go from its rest position to the first port for suddenly releasing the air pressure into the container.

Pressurizing the container 10 in this way thus expels the water at the maximum instantaneous pressure in the chamber and thus through the fill of coffee, thereby preparing an excellent infusion with all of the aroma being extracted.

As soon as the cup is full, the pushbutton 33 is operated to close the compression chamber 18 and connect the container to ambient air, thereby providing a safety function.

Other variant embodiments of the invention may be envisaged without going beyond the ambit of the invention; for example, it is possible to replace the hand pump with an electric air pump, or even a gas cartridge, and the on/off valve with a slider may be replaced by an electromagnetic valve. Furthermore, the invention is applicable to preparing an infusion of tea or of chocolate, in particular starting from a pod.

The invention claimed is:

1. An appliance for preparing an infusion, the appliance comprising:
    a case, said case comprising (a) an infusion head containing a chamber with an opening through which a fill of substance for infusing can be inserted and presenting in its end wall a hot water feed nozzle, and that is fitted with a closure part presenting an outflow orifice for the infusion, the closure part being movably mounted relative to said chamber to transition between two positions, an open position and a closed position, the open position corresponding to filling and emptying said chamber and the closed position corresponding to preparing the infusion with the closure part closing the chamber, and with a water container communicating with said nozzle, and (b) a body containing a pressurizing device having an active state or an inactive state and designed to be in the active state to deliver air in order to pressurize said water container, and
    control means suitable for causing a certain volume of water raised to an infusion temperature to be delivered from said container into the infusion chamber,
    said pressurizing device being connected to a compression chamber that is arranged between said pressurizing device and said water container and that includes inlet and outlet isolation devices,
    wherein with the water container being full and the outlet device including the control means, the control means are suitable, when the pressurization device is placed in the inactive state, for causing compressed air to expand suddenly into said water-filled container and then to flow with a pressure curve that decreases down to the end of an infusion cycle,
    wherein the outlet isolation device includes an outlet nozzle connected to a duct leading to the water container and including the control means formed by an on/off type valve,
    wherein said on/off valve comprises a movable slider slidable in a two-port cylinder so as to occupy, starting from a rest state corresponding to closure of the outlet isolation of the compression chamber, a first port corresponding to delivering the air pressure into the container and beginning infusion, and a second port corresponding to stopping the delivery of air pressure to the container and thus stopping infusion, and connecting the container to the surrounding atmosphere.

2. The appliance according to claim 1, wherein said inlet isolation device includes an inlet passage containing a check valve.

3. The appliance according to claim 1, wherein the hot water feed nozzle includes a distribution grid with its outside face practically corresponding dimensionally with the inlet area of the face of the fill that is in contact with said grid.

4. The appliance according to claim 3, wherein the grid presents a plurality of holes with the sum of their sectional areas forming a fluid flow section occupying 10% to 25% of the area of the face of the fill, and preferably occupying 17%.

5. The appliance according to claim 3, wherein the water container is generally in the shape of a bell with its mouth engaging on the outside wall of the chamber, which outside wall presents, for this purpose, a shape that is complementary to the shape of the mouth of the container.

6. The appliance according to claim 1, wherein the body presents an oblong shape, with the head being located transversely thereon so that part of the body constitutes grip means, wherein the pressurizing device is a hand-operated air pump comprising a tube with a cylindrical wall that slidably receives a piston, the tube having a perforated end for passing the rod of the piston, which rod is connected to a handle, and an end including the inlet means, the compression chamber being arranged between said wall of the tube and the body that has an internal wall mounted in leaktight manner with the wall of the tube.

7. The appliance according to claim 6, wherein the internal wall of the body is cylindrical and arranged coaxially about the tube, and the compression chamber is suitable for receiving at least one volume element for adjusting the capacity of said chamber.

8. The appliance according to claim 7, wherein the volume element is constituted by a ring placed around the tube.

9. The appliance according to claim 6, wherein the valve is arranged on the body in the grip means and close to the head and comprises a pushbutton projecting from the case so as to be suitable for being controlled by the thumb of the user.

10. The appliance according to claim 9, wherein the valve comprises a movable slider connected to the pushbutton and slidable in a two-port cylinder so as to occupy, starting from a rest state corresponding to first closure of the outlet isolation device of the compression chamber, a first port corresponding to delivering the air pressure into the container and beginning infusion, and a second port corresponding to stopping the delivery of air pressure to the container and thus stopping infusion, and connecting the container to the surrounding atmosphere.

11. The appliance according to claim 1, wherein the container is removably mounted on a frame secured to the case, thereby enabling containers of different capacities to be fitted.

12. The appliance according to claim 2, wherein the duct including the control means and leading from the outlet nozzle to the water container presents a diameter that is substantially equal to 0.3 mm, in full or in part.

13. The appliance according to claim 1, wherein the outlet isolation device is connected to a duct which opens out vertically into a top portion of the water container.

* * * * *

UNITED STATES PATENT AND TRADEMARK OFFICE
CERTIFICATE OF CORRECTION

PATENT NO. : 8,578,839 B2  Page 1 of 1
APPLICATION NO. : 12/527092
DATED : November 12, 2013
INVENTOR(S) : Nielsen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1020 days.

Signed and Sealed this
Twenty-second Day of September, 2015

Michelle K. Lee
*Director of the United States Patent and Trademark Office*